United States Patent [19]

Drerup

[11] Patent Number: 5,579,481
[45] Date of Patent: Nov. 26, 1996

[54] SYSTEM AND METHOD FOR CONTROLLING DATA TRANSFER BETWEEN MULTIPLE INTERCONNECTED COMPUTER SYSTEMS WITH AN UNTETHERED STYLUS

[75] Inventor: Bernard C. Drerup, Austin, Tex.

[73] Assignee: International Business Machines Corporation, Armonk, N.Y.

[21] Appl. No.: 434,905

[22] Filed: May 1, 1995

Related U.S. Application Data

[63] Continuation of Ser. No. 922,900, Jul. 31, 1992, abandoned.

[51] Int. Cl.⁶ ................................................ G06F 13/00
[52] U.S. Cl. .......................... 395/200.01; 395/200.09; 395/200.02; 345/179; 345/180
[58] Field of Search ........................... 395/200.01, 200.09

[56] References Cited

U.S. PATENT DOCUMENTS

| | | | |
|---|---|---|---|
| 4,246,439 | 1/1981 | Romein | 178/18 |
| 4,271,482 | 6/1981 | Giraud | 235/380 |
| 4,654,648 | 3/1987 | Herrington et al. | 345/179 |
| 4,686,332 | 8/1987 | Greanias et al. | 345/173 |
| 4,885,433 | 12/1989 | Schier | 178/19 |
| 5,007,085 | 4/1991 | Greanias et al. | 380/25 |
| 5,008,853 | 4/1991 | Bly et al. | 395/153 |
| 5,072,076 | 12/1991 | Camp | 178/18 |
| 5,220,657 | 6/1993 | Bly et al. | 395/479 |
| 5,226,120 | 7/1993 | Brown et al. | 395/200.11 |
| 5,239,373 | 8/1993 | Tang et al. | 348/14 |
| 5,261,052 | 11/1993 | Shimamoto et al. | 395/200.01 |
| 5,293,619 | 3/1994 | Dean | 395/650 |
| 5,300,943 | 4/1994 | Jakobs et al. | 345/1 |
| 5,315,705 | 5/1994 | Iwami et al. | 395/200.16 |
| 5,363,507 | 11/1994 | Nakayama et al. | 395/800 |
| 5,379,374 | 1/1995 | Ishizaki et al. | 395/155 |

FOREIGN PATENT DOCUMENTS

| | | |
|---|---|---|
| 262991A2 | 4/1988 | European Pat. Off. . |
| 365918A2 | 5/1990 | European Pat. Off. . |
| 2-310718 | 3/1990 | Japan . |

OTHER PUBLICATIONS

IBM TDB, "Automatic Stylus Identification System", vol. 34, No. 2, Jul. 1991, pp. 406–409.

Primary Examiner—William M. Treat
Assistant Examiner—Kenneth R. Coulter
Attorney, Agent, or Firm—Mark E. McBurney; Robert M. Carwell; Richard A. Henkler

[57] ABSTRACT

A system and method are provided wherein a user of an interconnected computer system can identify a specific piece of data and then access this data from another computer in the network. This is extremely useful since it is often desirable for data to be capable of being displayed and manipulated from another system during meetings, discussions and the like. The user who wishes to transfer a file to another system simply points an untethered stylus to a representation of a file, such as a filename, icon, or the like and then selects the file to be transferred. The user then carries the stylus to a remote interconnected computer and points the stylus at the remote computer which verifies the identity of the stylus and obtains a path to the selected file. The data file is then transferred from the user's computer to the remote computer through the network.

12 Claims, 6 Drawing Sheets

SYSTEM AND METHOD FOR CONTROLLING DATA TRANSFER BETWEEN MULTIPLE INTERCONNECTED COMPUTER SYSTEMS WITH AN UNTETHERED STYLUS

This is a continuation of application Ser. No. 07/922,900 filed Jul. 31, 1992 now abandoned.

BACKGROUND OF THE INVENTION

1. Field of the Invention

The present invention generally relates to transferring data between interconnected computer systems. More particularly, a stylus is used to select data in a first computer and then causes the selected data to be transferred to an interconnected remote computer by identifying itself as the data owner to the remote computer. Also, the stylus can be used to select a program running on the first computer such that the selected program can be accessed, by using a terminal type link, from the remote computer.

2. Description of Related Art

Typically, in transferring data between interconnected data processing systems a user will execute transmit/receive commands on the appropriate computers, or establish a shared disk between them. However, these methods require the user to specify a large amount of information and to foresee and identify all possible destinations that may need to receive the data.

Additionally, it is currently possible to move data from one system to another via floppy disks, but they are slow, relatively bulky and limited by the amount of data that can be transferred.

However, none of the conventional methods of transferring data between interconnected systems contemplate the use of an untethered stylus to identify and initiate the transmission of data. U.S. Pat. No. 4,686,332 describes a finger touch and stylus detection system for use on a visual display for entering commands to a system. Further, U.S. Pat. No. 5,007,085 also describes a stylus as peripheral device in an interconnected system. An input system on a computer within the interconnected system includes stored program instructions which control detection and log-on procedures for a stylus that is sensed by a remote computer system.

Although, it can be seen that use of a stylus in a network of interconnected data processors is known, there is no provision for conveniently transferring data between interconnected systems based on information input from an untethered stylus such that data appears to have been transferred by the user's stylus, when the user inputs data on a remote computer.

SUMMARY OF THE INVENTION

In contrast to the prior art, the present invention allows a user of an interconnected computer system to identify a specific piece of data and then access this data from another computer in the network. This is extremely useful since it is often desirable for data to be capable of being displayed and manipulated from another system during meetings, discussions and the like.

The user who wishes to transfer a file to another system simply points an untethered stylus to a representation of a file, such as a filename, icon, or the like and then selects the file to be transferred. The user then carries the stylus to a remote interconnected computer and points the stylus at the remote computer, thereby transferring the data file from the user's computer to the remote computer through the network. This transfer appears to be transparent to the user.

Similarly, a user may establish a "link" to a program running on the user's home computer system from a remote location. More particularly, the stylus is used to select the running program prior to the user's departure. Once at the remote location, the user enables the stylus which identifies the path to the home computer and the program. In this manner the link is created between the remote computer and the program running on the user's home computer such that keystrokes, or other input data is provided from the remote computer to the program, and output data from the program is displayed on the remote system.

One example of a hardware system contemplated by the present invention includes an untethered stylus with a battery that transmits a magnetic field when enabled (usually by being placed in close proximity to a computer screen). The computer system contains a matrix of wires and control logic which monitors the actions of the stylus by detecting the emitted magnetic field. The computer systems must be able to uniquely identify each stylus in order to link it with the selected file. The stylus can be made to emit an identification code when it is brought near the display. Generally, whenever a user selects a file, the user's computer system records an association between the stylus identification code and, the file. Subsequently, when the stylus ID code is detected at another computer system in the network, the data is transferred, through the network, to the other computer.

One method of implementing this is to associate each stylus with a "home-base" computer. The ID code emitted by the stylus would include the path to the home-base computer (directly or through a look up table). The home-base computer would then transfer the selected data to the remote computer that detected the stylus ID code.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
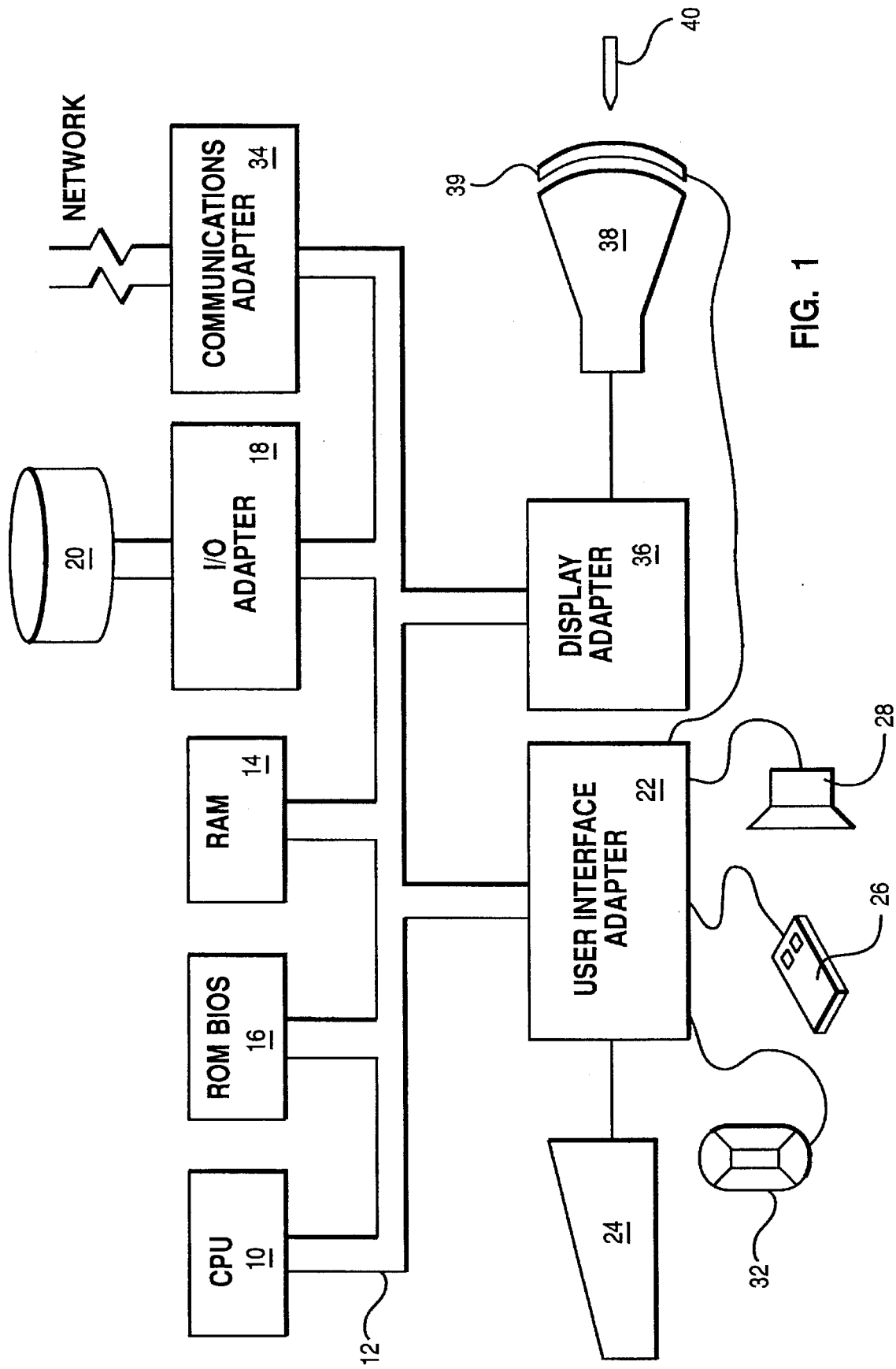
FIG. 1 is a schematic diagram showing the various components of a data processing system that can be interconnected in a network and which can take advantage of the present invention.

Referring to FIG. 1, a typical data processing system is shown which may be used in conjunction with the present invention. The central processing unit (CPU) 10, may be one of the Intel X86 processors and is provided and interconnected to the various other components by system bus 12. Read only memory (ROM) 16 is connected to CPU 10 via bus 12 and includes the basic input/output system (BIOS) that controls the basic computer functions. Random access memory (RAM) 14 I/O adapter 18 and communications adapter 34 are also interconnected to system bus 12. I/O adapter 18 may be a small computer system interface (SCSI) adapter that communicates with a disk storage device 20. Communications adapter 34 interconnects bus 12 with outside networks enabling the data processing system to communicate with other such systems. Input/output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. An untethered stylus 40 is also shown which will allow a user to interact with the system shown in FIG. 1, through display 38. A stylus receiver/detector 39 is also shown which is essentially a matrix of electrical conductors (for detecting electromagnetic fields) embedded in a transparent membrane and placed over the screen (CRT) of display 38. The means by which stylus 40 interacts with display 38 is well known in the art as previously noted by U.S. Pat. No. 4,686,332 and 5,007,085 which are hereby incorporated by reference. In this manner, a user is capable of inputting data to the system through the keyboard 24, track ball 32, mouse 26 or stylus 40 and receiving output from the system via speaker 28 and display 38. Additionally, an operating system such as DOS or the OS/2 system (OS/2 is a Trademark of the IBM Corporation) is used to coordinate the functions of various components shown in FIG. 1. It should be noted that a stylus, or pen, is described herein merely as an example of one type of device that can be used in conjunction with the present invention. Any other untethered devices or means that are capable of identifying a user to a computer, such as computer recognizable optical or audio commands (including tones and voice) are also contemplated by the present invention.

Figure 2:
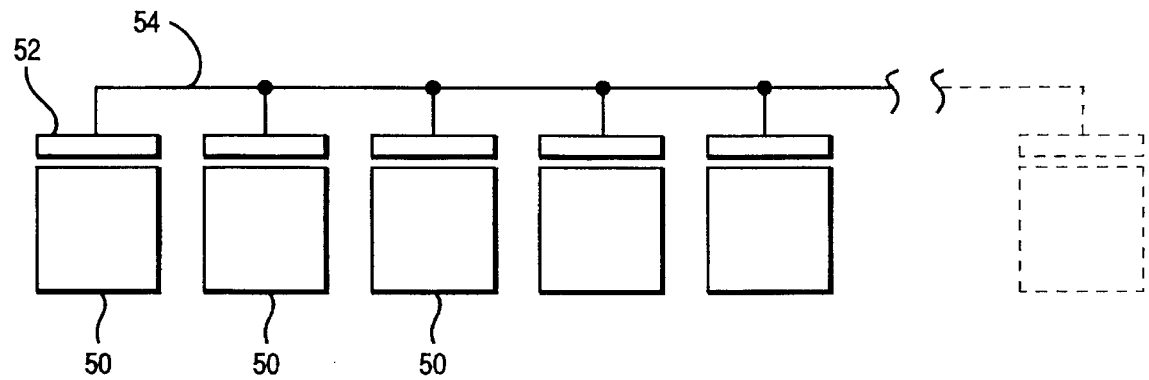
FIG. 2 shows a network of interconnected computer systems.

FIG. 2 shows a plurality of interconnected data processing systems 50. These systems may include personal computers such as the IBM PS/2, or workstations such as the IBM RISC System/6000 (PS/2 and RISC System/6000 are Trademarks of IBM Corporation) or the like. Reference numeral 50 represents a hardware platform having components such as those illustrated in FIG. 1. A bus 54, or the like interconnect each of the plurality of systems 50 such that a network of data processing systems is provided. Each system 50 will include a communications interface 52 which is a communications protocol program, such as TCP/IP, that is effectively a communications program device driver for each individual system shown in FIG. 2. It should be noted that many connection schemes are known in the art and the present invention is not dependent upon a particular type of network system, but may be implemented on any system with interconnected data processing system capable of communicating with one another. The previous description of a typical system is provided as an example only, and should not be considered a limitation or requirement of the present invention.

Figure 3:
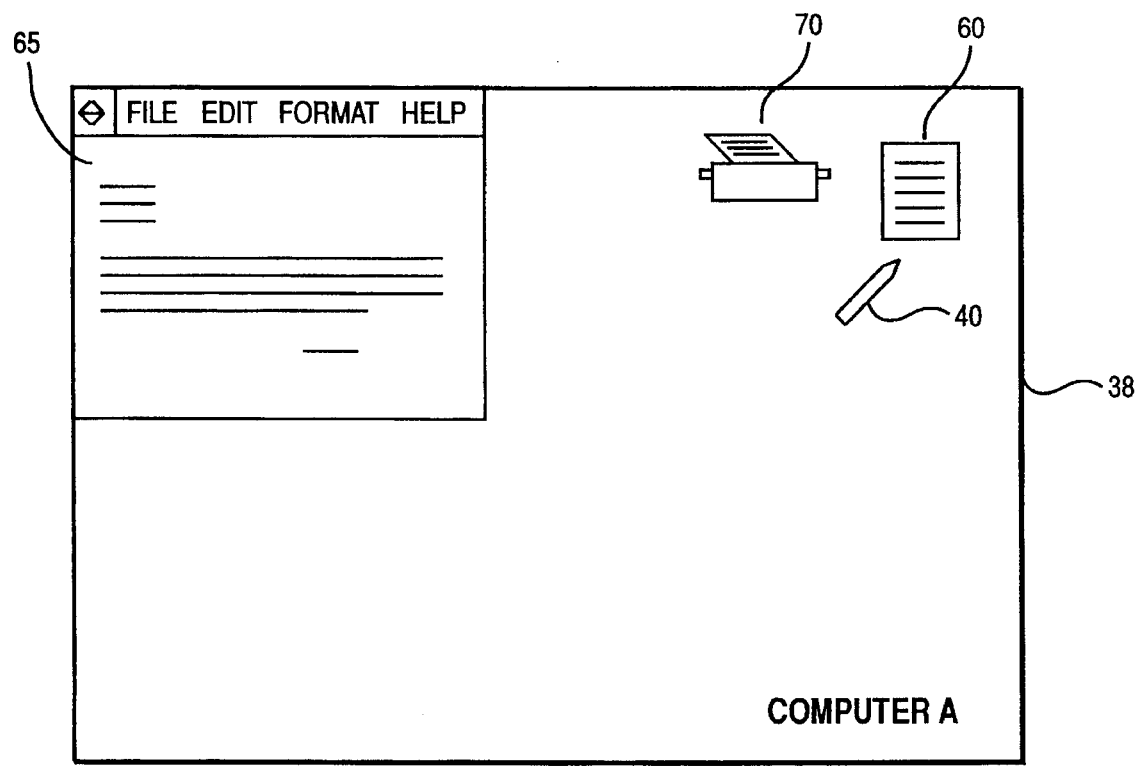
FIG. 3 is a display screen of a user's computer system during selection of a file to be transferred using the present invention.

FIG. 3 is a screen from display 38 which shows computer program 65 (running in a window), two icons 60 and 70 as well as stylus 40. It should be noted that is FIGS. 3–6 the stylus 40 is actually above the screen, but close enough for the system to detect its presence. Icons 60 and 70 represent objects which are programs in object oriented format. For example, icon 70 is a printer function program, or printer device driver to control the printing operations of the data processing system. Similarly, icon 60 may be a word processing program application or a document stored in the word processing application. It should be noted that object oriented programming is well known in the art and extensively used in computer programs such as OS/2 (OS/2 is a Trademark of IBM Corporation) and WINDOWS (WINDOWS is a Trademark of Microsoft Corporation). Generally, these objects are selected either by keyboard strokes or by clicking on the icon with a mouse. Similarly a user interacts with active program 65 (which may be a word processing program, game, or the like) by using the keyboard an/or a mouse, depending upon the capabilities of the program. Of course, input means such as a stylus 40 can also be used to select an icon representative of an object oriented program as contemplated by the present invention.

In order to implement the present invention, the interconnected computer system must be able to uniquely identify each stylus 40 in order to link the stylus, or pen, with selected data, or a running program. Stylus 40 can be modified such that it contains a unique identification code which is emitted when it is brought near the display. Again, in a system used as an example of the present invention, the stylus is battery powered and transmits a magnetic field when enabled, which occurs when the stylus is brought in close proximity to the computer screen. A matrix of wires and control logic is contained in a transparent film placed over the computer screen that allows actions of the stylus to be monitored by detecting the magnetic field emitted by the stylus when enabled. When a user selects a data unit, such as icon 60 (representing an object oriented program) or a running program, the computer system records an association between the stylus identification code and the particular entity. It should be noted that "entity" as used herein will include both data units (files or data files) as well as active (running) programs, e.g. programs 63, 65 and inactive program 70. In this manner, if the stylus identification code is then detected at another remotely interconnected computer system the data is transferred through the network to the other computer.

Additionally, if a running program is selected at the home computer and the stylus identification code is then detected at the remote computer, a "link" is established from the remote computer to a program running on the home computer. It should be noted that remote terminals are know in the art, however an embodiment of the present invention is utilized to establish this link between remote computer systems. This link will allow a user to input commands, e.g. keystrokes, mouse clicks, to the running program from the remote system, and also to receive display output from the running program. In this manner, a user can remotely interact with a computer program running on the user's home computer, through the link established by the system of the present invention. One advantage of providing this linking capability is to allow a user to run a program on the home computer so that the initialization time required to start the program will be unnecessary from the remote location. For example, a word processing program can be running with a particular document being edited such that the user can immediately access the program and the document, without having to initialize the program and select the document. In other words, the user can leave a program running with work in progress at one computer and access the program (work), from another interconnected system, at the point where the user left it. Further, establishing a link eliminated any need to transfer the program from the home computer to the remote computer when its use is desired. Those skilled in the art will understand that the same path between interconnected home and remote computers, used to transfer data, can be used to establish the linking feature of the present invention. It should be understood that a user must select a program prior to leaving the home system, and leave the selected program running at the home computer, in order to interact with the program via the link.

It is possible to establish a connection between all the computers in the network such that upon detection of the stylus identification code and a data unit selection, at any one of the network computers, the system containing the data unit would distribute the data or its address to all systems interconnected on the network. This solution may be somewhat impractical in large networks, however storing associations on a server system may be acceptable.

In a preferred embodiment of the present invention each stylus will be associated with a "home-base" computer. The emitted identification code from the stylus would include a path to home-base. This path can be implemented either directly in the identification code or through the use of a look-up table, or the like. All of the associations between the stylus id code and data unit association will be listed on the home-base computer.

Returning to FIG. 3, an example of the operation of the present invention will now be provided, wherein computer A is considered to be the home-base computer for stylus 40. An identification code (stylus identification, or SID) is associated with stylus 40. The user then selects an entity from home-base computer A. In this example, object 60 is selected by the user. It can be seen that object 60 may be a document, or other program that a user has created on the home-base computer and now wishes to transfer to another system for purposes of discussion, meeting, revisions, or the like. Subsequent to selection of object 60 by the user, computer A makes a data base entry in a table, or the like, that includes the stylus identification code, the address where object 60 is located, and the name of object 60. The user then physically carries stylus 40 to another computer B on the network. It should be noted that this computer can be across the hall or across the country, as long as the computers are interconnected and contain the same communication protocol, as previously discussed.

Figure 4:
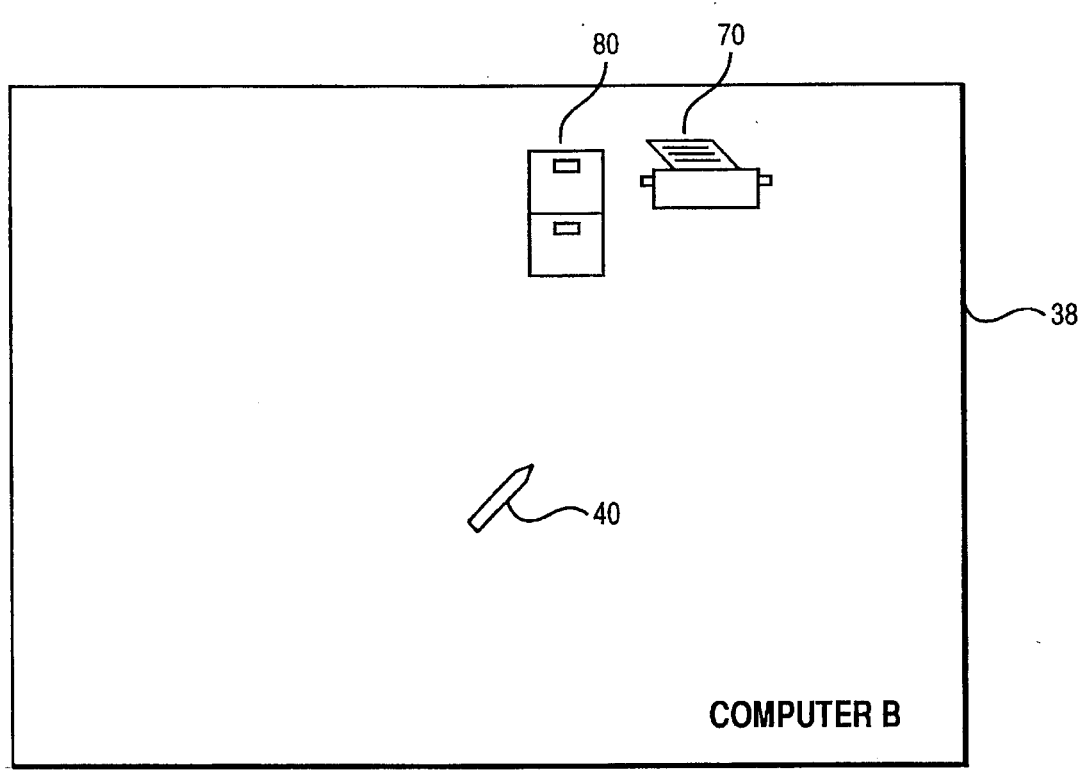
FIG. 4 is a display screen of a remote interconnected computer system before the selected file has been transferred thereto.

FIG. 4 represents a computer, e.g. computer B, that is interconnected to computer A. Computer B includes objects 70 and 80, but not object 60, since Figure represents the state of computer B prior to implementation of a data transfer as contemplated by the present invention. The user places stylus 40 in close proximity to screen 38 and receiver 39 of computer B such that the stylus is enabled. Computer B then recognizes the stylus identification code as valid and looks up the home-base computer for the stylus corresponding to the identification code. Computer B will find that home-base for stylus 40 is computer A. Computer B then asks computer A for the table entry created for the stylus 40. Computer A will then send the stylus entry to computer B and include the name (filename) of the entity (the data unit) and its address. In this case, computer B will ask computer A for object 60, which is then transmitted through computer B for display on screen 38 thereof.

Figure 5:
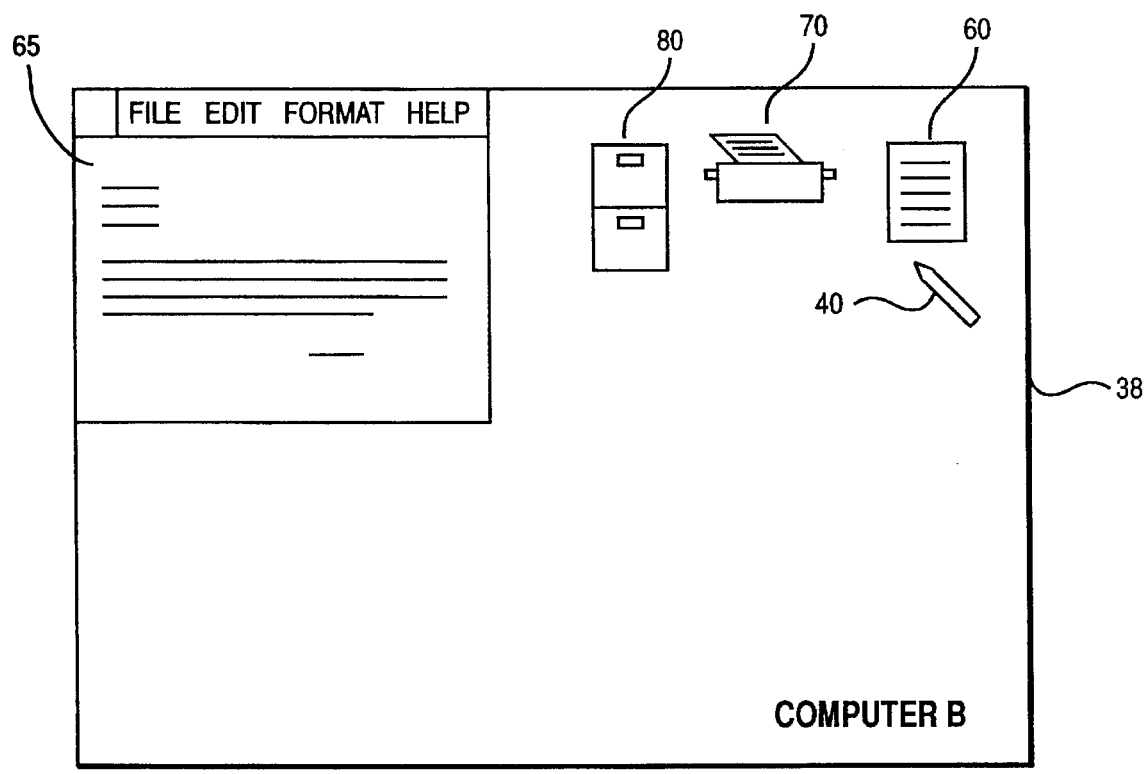
FIG. 5 is the display screen of the remote interconnected computer system after the user has implemented transfer of the selected file from the user's home computer.

In this manner, object 60 is now displayed on screen 38 of computer B, as shown in FIG. 5. Thus, data is transferred from one computer to another through a network by use of a stylus identification code and a table entry that includes the address for the object to be transmitted, the stylus identification, and the object name. It will appear to the user that the present invention is a variation of the "drag and drop" concept which has been extended to work between separate computer systems rather than merely move objects across the screen of a single system. The user will select the object to be mowed (or transmitted to a separate computer and then physically carry the stylus, to another interconnected system. The user then points the stylus to a space on the screen of the second computer and "drops" the data. The data is then transferred through the network to the second computer, but appears to a user to have been dropped by the stylus 40. Thus it will appear to the user that the data is dragged from one computer to a remote interconnected computer and then dropped thereon.

Also, in accordance with the present invention, the user may select program 65, or task, such as a word processing program, or the like, running on computer A. The user can then carry the stylus to remote computer B and identify the stylus to computer B. Similar to the transfer of data, computer B will determine that computer A is home-base for this stylus and ask computer A for the table entry created for this program. The table entry will be sent by computer A to computer B and will include the program name and address. Thus, a link is established from computer B to the program (task) running at computer A such that a remote user is capable of interacting with the program.

Again referring to FIGS. 3–5, an alternate use of the present invention will be described. For example, again assume that computer A is the home-base system for the stylus. The user is currently working on computer B and desires to transfer a printer driver 70 in object form to computer A by use of stylus The user "gets", or selects, printer driver 70 on computer B which then looks up the home-base computer for the stylus 40. Computer B then finds that computer A is the home-base and sends a table entry that includes the stylus identification code, an entity address at computer B, and entity filename to computer A. The user then returns with stylus 40 to the home-base computer A. The stylus is then enabled such that the user asks for the entity (object 70) to be "put" into computer A. This time computer A looks up the address of the stylus identification code and finds that it (computer A) is the home-base computer for this particular stylus., i.e. address is equal to computer A. The table entry for the stylus identification code 40 is then obtained from computer B along with the entity name. Subsequently, computer A asks computer B for the entity, in this case printer driver 70, which is then displayed on computer A. Thus, it can be seen how the present invention allows data to be selected on a home-base computer such that it can be transferred to other interconnected computers in the system, and data can be selected on a remote interconnected system for transfer back to the home-base computer, as desired by a user. Additionally, a user can establish a link from the home computer to the remote computer by: initiating a program at the remote location; selecting the running program; and identifying the stylus to the home computer. This will establish the link back to the program running on the remote computer. For example, program 65 is running on computer B and by use of the present invention a user can access and interact with program 65 from computer A by establishing a link back to computer B using the method described above.

Figure 6:
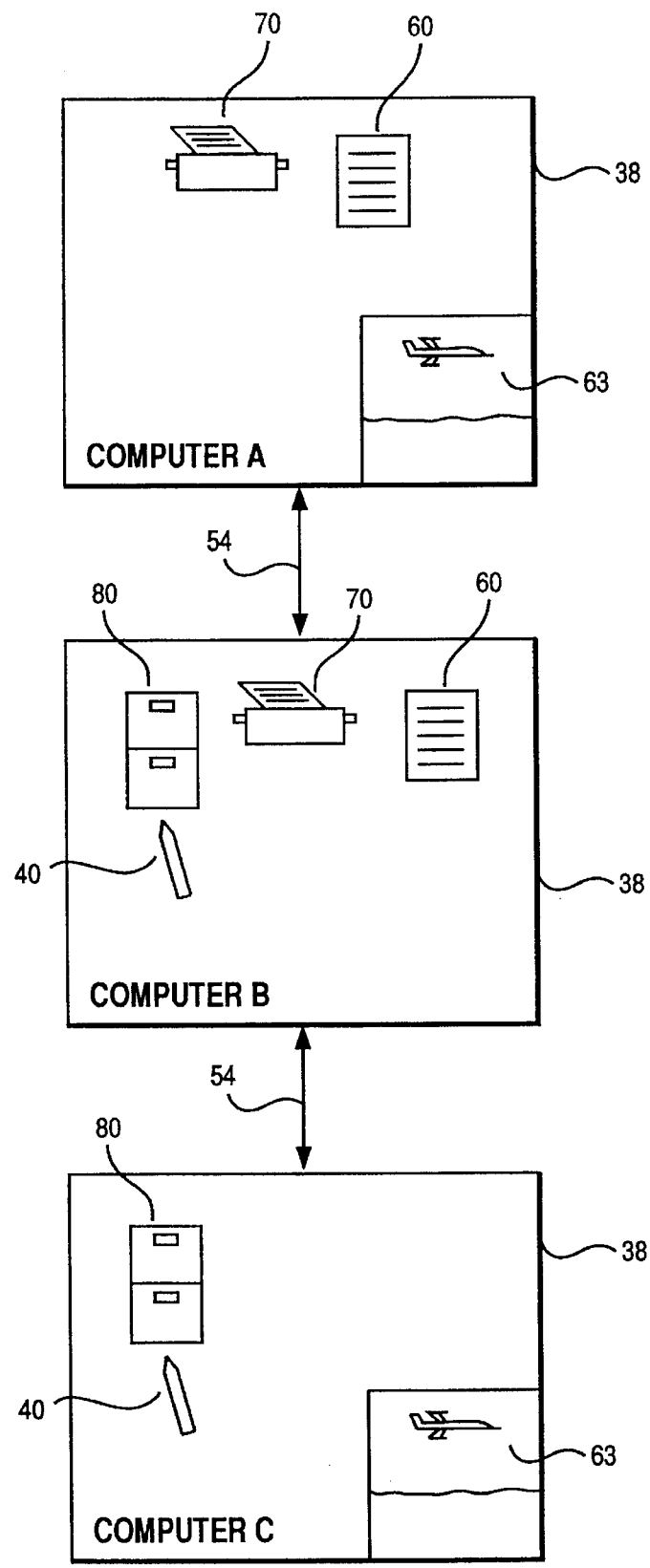
FIG. 6 shows the display screens of the user's home computer and the display screens of two remote interconnected computer systems to illustrate the utility of the present invention on plural remote systems.

Another use of the present invention will now be described with regard to FIG. 6. Again, computer A is shown with objects 60 and 70 displayed on screen thereof. Computer B is interconnected to computer A by network 54 and includes objects 50 and 70 along with a data base, or file program representative by icon 80. Objects 60, 70 and 80 are displayed on screen 38 of computer B. Another interconnected computer C is shown having object 80 displayed on screen 38 thereof. Again, the home-base computer for stylus 40 is computer system A. In this example, the user is physically located at computer system B and selects object 80 (the data base or file program) displayed in object oriented format on screen 38 of computer B. The stylus identification code is validated by computer B which also looks up the address of the stylus and sees that computer A is the home-base system for this particular stylus. Computer B then sends the table entry including the stylus identification code, computer B as the address of the program represented by icon 80 and the name of the program to computer A. The user then physically carries the stylus 40 to computer C which is another interconnected computer on the system. Stylus 40 is enabled and the user seeks to "put" the program represented by icon 80 onto computer C. Upon enablement of stylus 40, computer C looks up the address associated with the identification code for stylus 40. Computer C then determines that computer A is the home-base computer for this particular stylus and asks computer A for the table entry (previously sent by computer B) associated with this stylus identification code. Computer C then obtains the table entry for the stylus identification and determines that the address of the program is at computer B and also determines the program name for the object oriented program represented by icon 80. Computer C then asks computer B for the program using the filename of the program from the table entry and displays the program represented by icon 80 subsequent to transfer of the data from computer B to computer C. Again, it should be understood that a user can run a program on any one of the interconnected computer systems and establish a link back to that program, or task, from any other of the interconnected computer systems by using the method previously described with regard to the transfer of data between systems, i.e. identifying the stylus and its home-base computer and accessing the look up table entry to obtain the address for the entity. More particularly, game program 63 is left running on computer C and a link can be established from computer A that will allow a user to interact with game 63 on computer C.

Therefore, it can be seen how a stylus can be associated with a particular home-base computer and a user may work between several remote interconnected systems (which are not home-base for the stylus) and transfer data between remote computers as well as a remote computer and the home-base computer or vice-versa. In this manner, a great deal of flexibility is provided as a user travels or needs to share various programs with other interconnected users.

Figure 7A:
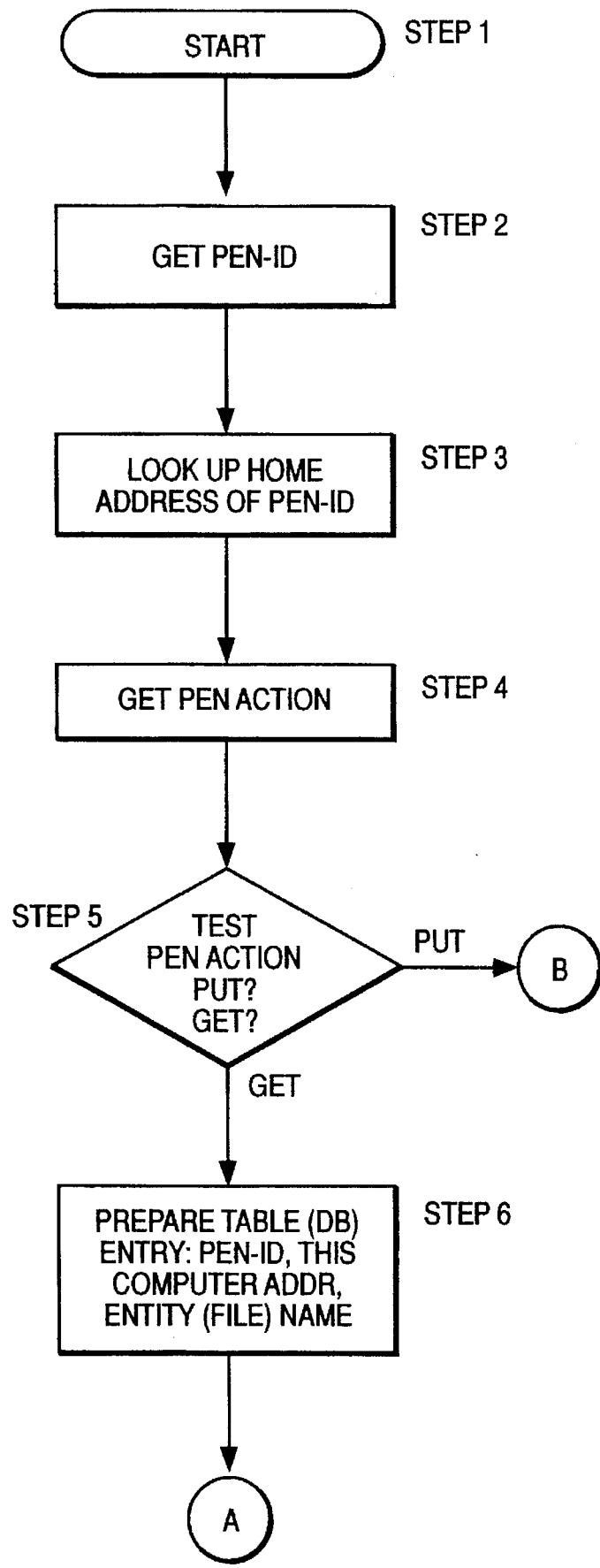
FIG. 7A and 7b are flowcharts illustrating the method by which the present invention transfers data from one interconnected computer to another using an untethered stylus.
Figure 7B:
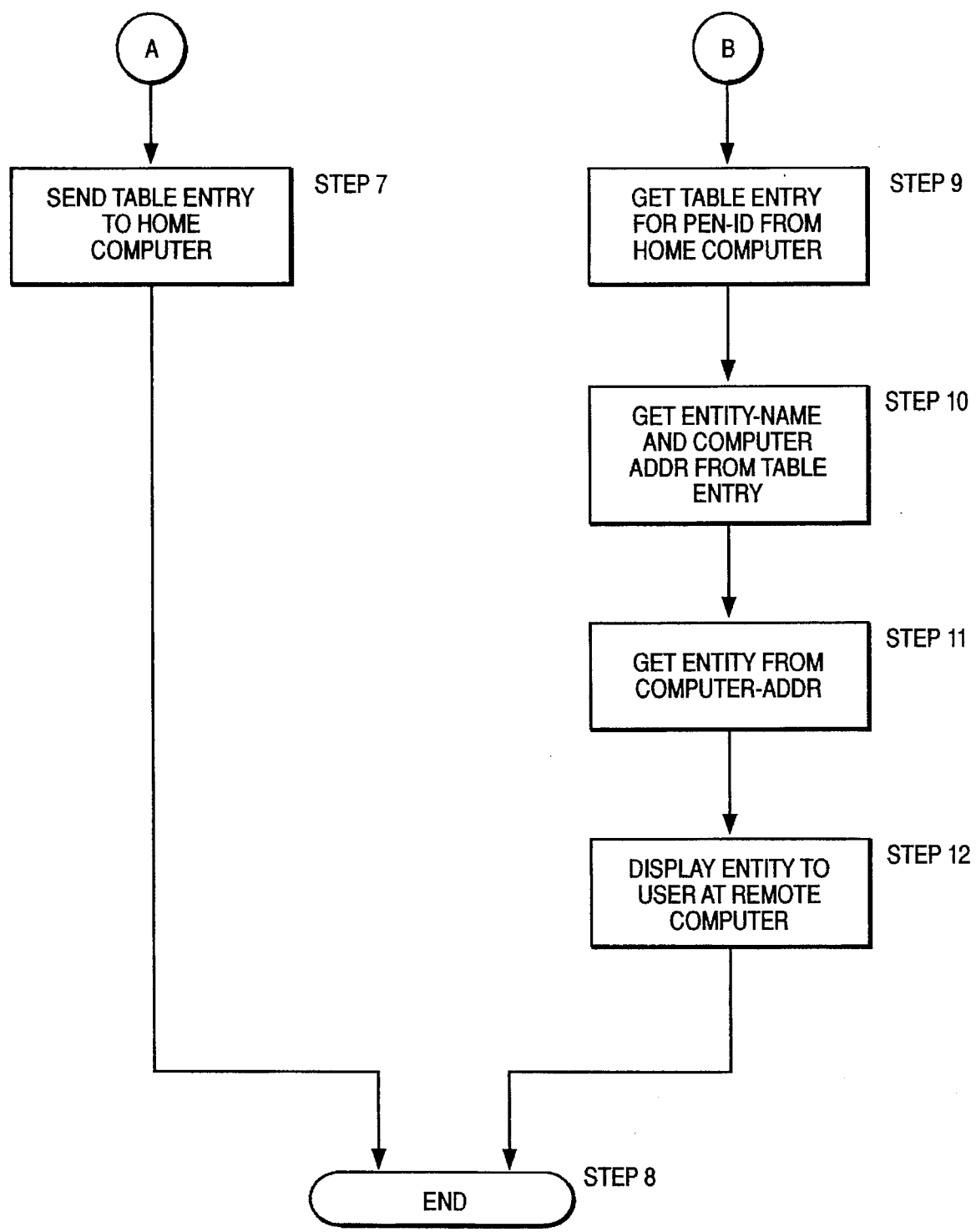

FIGS. 7A and B are flowcharts that represent the process by which the stylus 40, or pen can be used to implement the transfer of data among various interconnected computer systems. At step 1 the process is started, and at step 2 the identification code for a particular stylus is obtained by the computer system at which the user is currently pointing the stylus. The address of the home-base computer associated with the particular pen identification, is then looked up from a table, or the like at step 3. The computer at which the user is currently working (and where the pen is enabled) receives (gets) the pen action at step 4. It is then determined at step 5 what type of pen action is desired by the user. For example, a certain code will be present if the user to desires to select (or get) a particular object (data or program), whereas another code will be present (or the get code will be absent) when the user desires to put a particular object onto the computer system at which the user is currently working. If the user is selecting an object for potential future transfer to a remote system, or a link to a running program, the process continues to step 6 where a table entry is prepared which includes data relating to the pen identification code, the computer address for the system at which the user is currently selecting (getting) the program, and the filename of the data, or the name of the program (entity name) that has been selected by the user. Subsequent to preparation of the table entry, the computer at which the user is working sends the table entry to the home-base computer that is associated with the particular stylus (step 7). Subsequent to step 7, the get function is completed and the process ends at step 8. Returning to step 5, if the user currently wishes to place (or put) a previously selected data unit or program link onto the system at which the user is currently working, the table entry previously prepared when the data unit or program was selected is obtained (step a) from the home-base computer using the associated pen id code (recognized by the computer system at which the user is working). Subsequent to obtaining the table entry, the computer at which a user desires to display the data unit or program obtains the entity name and the computer address at which this particular entity resides from the table entry received from the home-base computer (step 10). Once the filename and address for the desired Knit is obtained, the entity is then transferred from the computer, at which the program resides, to the computer where the user desires the information to be displayed (step 11). Once obtained, the data unit is then displayed (step 12) at the remote computer, designated by the user. It should be noted that the data unit displayed on the remote computer, may be capable of being manipulated by the user from the remote site and not merely displayed. If a user desires to link to an running program, the link is established (step 11) and the display output from the running program is displayed at step 12 such that a user can interact with the program. Subsequent to display of the data unit or linked program at the remote computer, the process continues to step 8 and ends. Therefore, it can be seen that the present invention contemplates a system wherein each user may have a uniquely identified stylus that is associated with a home-base computer. Various table entries can then be created for programs, or the like such that a path, through the home-base computer can be created a stylus with a particular identification can access any previously selected data unit through the home-base computer and the table entry.

Although certain preferred embodiments have been shown and described, it should be understood that many changes and modifications can be made therein without departing from the scope of the appended claims.

What is claimed is:

1. A method of transferring data between interconnected data processing systems, the method comprising the steps of:

assigning a user to a portable stylus which contains an identification of the user that is detectable by each of the data processing systems;

selecting, with said portable stylus, data from a first one of the data processing systems for transfer to an unidentified one of the data processing systems;

detecting the identification at a second one of the data processing systems via the portable stylus; and transferring, in response to the detection of the identification, the selected data to the second data processing system.

2. The method of claim 1 wherein said step of selecting includes the step of:

creating a table entry including an identification code of the portable stylus, an identification of the first data processing system, and the name of the selected data.

3. The method of claim 2 wherein the step of transferring includes the steps of:

obtaining, in response to detecting the identification, the table entry from the first data processing system;

determining the location of the selected data using the table entry; and transferring the selected data to the second data processing system.

4. In a network of computers, a method of providing control over a computer program, executing on a first one of the computers, with a second one of the computers, the method comprising the steps of:

assigning a user to a portable stylus which contains an identification of the user that is detectable by each of the data processing systems;

selecting, with the portable stylus, the computer program for control thereof by an unidentified one of the computers;

detecting the identification at a second one of the computers via the portable stylus; and linking, in response to detecting the identification, the second computer to the first computer, thereby providing control of the computer program to the second computer.

5. The method of claim 4 wherein the step of selecting includes the step of:

creating a table entry including an identification of the portable stylus, an identification of the first computer, and the name of the computer program.

6. The method of claim 5 wherein the step of linking includes the steps of:

obtaining, in response to detecting the identification, the table entry from the first computer;

determining the location of the computer program using the table entry; and linking the second computer to the first computer, thereby providing control over said computer program.

7. An apparatus for transferring data between interconnected data processing systems, the apparatus comprising:

means for assigning a user to a portable stylus which contains an identification of the user that is detectable by each of the data processing systems;

means for selecting, with the portable stylus, data from a first one of the data processing systems for transfer to an unidentified one of the data processing systems;

means for detecting the identification at a second one of the data processing systems via the portable stylus; and means for transferring, in response to the identification, the selected data to the second data processing system.

8. The apparatus of claim 7 wherein said means for selecting includes:

means for creating, in response to detecting the identification, a table entry including an identification code of the portable stylus, an identification of said first data processing system, and the name of the selected data.

9. The apparatus of claim 8 wherein the means for transferring includes:

means for obtaining, in response to detecting the identification, the table entry from the first data processing system;

means for determining the location of the selected data using the table entry; and means for transferring the selected data to the second data processing system.

10. The apparatus of claim 9 wherein the means for selecting includes:

means for creating a table entry including an identification of the portable stylus, an identification of the first computer, and the name of the computer program.

11. The apparatus of claim 10 wherein the means for linking includes:

means for obtaining, in response to detecting the identification, the table entry from the first computer;

means for determining the location of the selected data using the table entry; and means for linking the second computer to the first computer, thereby providing control over the computer program.

12. In a network of computers, an apparatus for providing control over a computer program, executing on a first one of said computers, with a second one of said computers, said apparatus comprising:

means for assigning a user to a portable stylus which contains an identification of the user that is detectable by each of the data processing systems;

means for selecting, with the portable stylus, the computer program for control thereof by an unidentified one of the computers;

means for detecting the identification at a second one of the computers via the portable stylus; and means for linking, in response to detecting the identification, the second computer to the first computer, thereby providing control of the computer program to the second computer.

* * * * *